US010701901B2

(12) United States Patent
Sarver

(10) Patent No.: US 10,701,901 B2
(45) Date of Patent: Jul. 7, 2020

(54) SELF-TIPPING HURDLES FOR PET TRAINING AND FITNESS

(71) Applicant: Eco Sports Group, Inc., Indianapolis, IN (US)

(72) Inventor: John T. Sarver, Indianapolis, IN (US)

(73) Assignee: Eco Sports Group, Inc., Indianapolis, IN (US)

( * ) Notice: Subject to any disclaimer, the term of this patent is extended or adjusted under 35 U.S.C. 154(b) by 438 days.

(21) Appl. No.: 15/670,690

(22) Filed: Aug. 7, 2017

(65) Prior Publication Data

US 2017/0332605 A1 Nov. 23, 2017

Related U.S. Application Data

(63) Continuation-in-part of application No. 15/524,170, filed as application No. PCT/US2016/037105 on Jun. 11, 2016, now Pat. No. 10,485,221.
(Continued)

(51) Int. Cl.
*A63K 3/04* (2006.01)
*A01K 15/02* (2006.01)

(52) U.S. Cl.
CPC .............. *A01K 15/027* (2013.01); *A63K 3/04* (2013.01); *A63K 3/046* (2013.01)

(58) Field of Classification Search
CPC ......... A01K 15/027; A63K 3/04; A63K 3/046
(Continued)

(56) References Cited

U.S. PATENT DOCUMENTS 2,827,116 A * 3/1958 Zalovcik .................. A63K 3/04
119/705
3,209,729 A * 10/1965 Zedaker ................. A63K 3/046
119/705
(Continued)

FOREIGN PATENT DOCUMENTS

CN 208823955 U * 5/2019
GB 2212046 A * 7/1989 ............. A63K 3/046
(Continued)

OTHER PUBLICATIONS

Dog on It Parks, Hound Hurdles™, http://www.dog-on-it-parks.com/hound-hurdles.html (last visited Mar. 29, 2017).
(Continued)

*Primary Examiner* — Claude J Brown
(74) *Attorney, Agent, or Firm* — Thomas | Horstemeyer, LLP

(57) ABSTRACT

Various embodiments for a self-tipping hurdle for pet training and fitness are described. A self-tipping hurdle may be portable, freestanding, and substantially symmetrical, where the hurdle is not required to be attached to the ground or other surface during operation. The self-tipping hurdle can include a first hurdle base having a first irregular octagonal cross-section; a second hurdle base having a second irregular octagonal cross-section; a first hurdle post coupled to the first hurdle base; a second hurdle post coupled to the second hurdle base; and at least one hurdle board disposed between the first hurdle post and the second hurdle post. The self-tipping hurdle can be configured to rotate a predetermined amount prior to a rotation of the self-tipping hurdle being substantially impeded when the at least one hurdle board is contacted by a pet.

20 Claims, 13 Drawing Sheets

Related U.S. Application Data

(60) Provisional application No. 62/218,025, filed on Sep. 14, 2015, provisional application No. 62/174,830, filed on Jun. 12, 2015.

(58) Field of Classification Search
USPC .......................................................... 119/705
See application file for complete search history.

(56) References Cited

U.S. PATENT DOCUMENTS

| | | | | |
|---|---|---|---|---|
| 3,514,062 | A * | 5/1970 | Gordon | A63B 5/02 248/248 |
| 3,584,604 | A * | 6/1971 | Wegner | A01K 15/027 119/705 |
| 3,685,824 | A * | 8/1972 | Quinn | A63K 3/043 482/17 |
| 4,323,034 | A * | 4/1982 | Carlson | A01K 15/027 119/705 |
| 4,793,288 | A * | 12/1988 | Hoadley | A01K 15/027 119/705 |
| 4,946,139 | A * | 8/1990 | Tomellini | A63K 3/046 119/705 |
| 4,989,821 | A * | 2/1991 | Wong | A63K 3/046 119/705 |
| 5,913,283 | A * | 6/1999 | Coury | A63K 3/046 119/705 |
| 5,924,386 | A * | 7/1999 | Lewis | A63K 3/046 119/705 |
| 5,967,093 | A * | 10/1999 | Vitt | A63K 3/046 119/705 |
| 6,263,835 | B1 * | 7/2001 | Santi | A63K 3/046 119/705 |
| 6,520,119 | B1 * | 2/2003 | Johnson | A63K 3/046 119/705 |
| 6,691,987 | B1 * | 2/2004 | Bonham | A63K 3/046 256/1 |
| 6,976,452 | B1 * | 12/2005 | Godsil | A63K 3/04 119/705 |
| 7,798,105 | B1 * | 9/2010 | Picard | A01K 15/02 119/705 |
| 2003/0084857 | A1 * | 5/2003 | Gavet | A63K 3/046 119/705 |
| 2006/0283399 | A1 * | 12/2006 | Bolduc | A63B 1/005 119/705 |
| 2008/0234108 | A1 * | 9/2008 | Males | A01K 15/027 482/16 |
| 2013/0174794 | A1 * | 7/2013 | Casiello | A01K 15/027 119/705 |
| 2015/0114308 | A1 * | 4/2015 | Dolphin | A63K 3/04 119/705 |
| 2016/0107096 | A1 * | 4/2016 | Flynn | A63K 3/046 119/705 |

FOREIGN PATENT DOCUMENTS

| | | | | |
|---|---|---|---|---|
| GB | 2244928 | A * | 12/1991 | ............. A63K 3/046 |
| GB | 2268411 | A * | 1/1994 | ............. A63K 3/046 |
| WO | WO-9324197 | A1 * | 12/1993 | ............. A63K 3/046 |

OTHER PUBLICATIONS

Dog on It Parks, Tri-Level Jump, http://www.dog-on-it-parks.com/tri-level-jump.html (last visited Mar. 29, 2017).
Dog on It Parks, Wall Jumps (2 Plank Option), http://www.dog-on-it-parks.com/wall-jumps.html (last visited Mar. 29, 2017).
Dog on It Parks, Beagle Bone Jump, http://www.dog-on-it-parks.com/beagle-bone-jump.html (last visited Mar. 29, 2017).
Barkpark, Rover Jump Over, http://www.dogparkproduct.com/activities/rover_jump_over.html (last visited Mar. 29, 2017).

* cited by examiner

SELF-TIPPING HURDLES FOR PET TRAINING AND FITNESS

CROSS-REFERENCE TO RELATED APPLICATIONS

This application in a continuation-in-part of U.S. patent application Ser. No. 15/524,170, entitled "BRIDGE CLIMBING APPARATUS FOR PET TRAINING AND FITNESS," filed May 3, 2017, which claims the benefit of and priority to International Patent Application No. PCT/US2016/037105, entitled "FREESTANDING PORTABLE PET TRAINING AND EXERCISE EQUIPMENT," filed Jun. 11, 2016, which claims priority to U.S. Provisional Patent Application No. 62/174,830, filed Jun. 12, 2015, entitled "FREESTANDING PORTABLE DOG TRAINING EQUIPMENT," and U.S. Provisional Patent Application No. 62/218,025, filed Sep. 14, 2015, entitled "FREESTANDING PORTABLE DOG TRAINING EQUIPMENT," the contents of which are incorporated by reference in their entirety herein.

BACKGROUND

Pets, such as dogs, cats, and other animals, require outdoor play, exercise, physical stimulation, and mental stimulation to be healthy. Animal parks and play areas contribute to the health and well-being of a pet by facilitating an environment where pets can play, exercise, learn, and train off their leash. However, animal parks and play areas tend to lack the equipment necessary to enable improvement to a pet's agility, balance, conditioning, and strength in its hindquarters, which is important for many pets, such as dogs, especially as they age, becoming susceptible to arthritis and hip dysplasia. Moreover, maintaining strong muscles in a pet's legs and hips helps maintain and even improve the pet's mobility. Most animal park and play area agility equipment currently offered are agility products that are not "intuitive" for a pet, meaning a pet has to be coached or trained to utilize the products, and may be reluctant to do so.

An additional problem with animal park and play area equipment is that they typically require holes to be dug or concrete to be poured into the ground in order to be installed, thereby destroying grass or other terrain and requiring specialized skills and equipment for installation. Thus, there is a need for animal park and play area equipment that facilitates the development of agility, balance, conditioning, and hindquarter strength in pets, while also being used in a way that does not negatively impact or destroy the terrain.

BRIEF DESCRIPTION OF THE DRAWINGS

Many aspects of the present disclosure can be better understood with reference to the following drawings. The components in the drawings are not necessarily drawn to scale, emphasis instead being placed upon clearly illustrating the principles of the disclosure. Moreover, in the drawings, like reference numerals designate corresponding parts throughout the several views.

DETAILED DESCRIPTION

In the following discussion, a general description of freestanding and portable self-tipping hurdles for training and exercising animals and its components is provided, followed by a discussion of various embodiments of the same. While various embodiments described herein refer to apparatuses used in the training or exercising of dogs, the freestanding portable pet equipment is not so limited and can be used in training or exercising other animals, such as cats, horses, and other pets.

Embodiments of the disclosure include various apparatuses, methods, and mechanisms directed to freestanding portable pet training and exercising equipment that can be used to create an environment where dogs and other pets can improve and develop agility, balance, and body strength. Such apparatuses, methods, and mechanisms can be employed in various ways to allow pets to play and train without the apparatuses destroying or puncturing the terrain. Such apparatuses, methods, and mechanisms can also be employed in various ways to allow for an easy assembly by an end user, as well as to make the product portable if, for example, a user decides to move equipment to differing locations for shade variance, turf management, seasonal weather, or other reason. In addition, the disclosed equipment is more intuitive for pets and designed to be more playful or play-related while offering improvements to balance, stability, strength, and agility conditioning. The features of the disclosed products have been designed to be easy for a pet, such as a dog, to use and also more inviting by having low profiles and less step angles and using materials that have more natural aesthetics.

Figure 1:
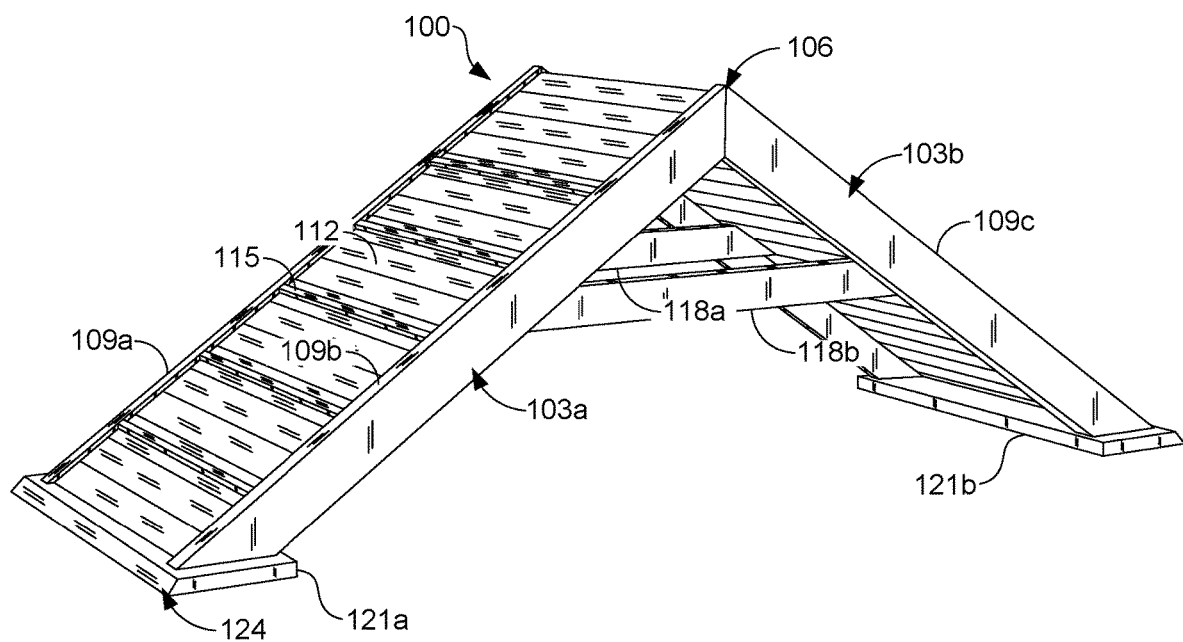
FIG. 1 shows a first embodiment of a freestanding portable pet apparatus according to various embodiments of the present disclosure.

With reference to FIG. 1, shown is a first embodiment of a freestanding portable pet apparatus 100 according to various embodiments of the present disclosure. To provide exercise to a pet, such as a dog, the freestanding portable pet apparatus 100 assumes the shape of a hill, thereby exercising muscles of a pet required to traverse an incline and navigate a decline. In some embodiments, the freestanding portable pet apparatus 100 can be symmetrical in shape.

In the example of FIG. 1, the freestanding portable pet apparatus 100 includes a first ramp 103a and a second ramp 103b (collectively "ramps 103") directly coupled at a coupling point 106, which can be located at a peak of the freestanding portable pet apparatus 100. In some embodiments, the first ramp 103a and the second ramp 103b assume an approximate incline and decline of or between 20° to 35°, respectively; however, in alternative embodiments, each ramp 103 can assume a lower or higher degree of incline as suited. The first ramp 103a and the second ramp 103b can include ramp sides 109a . . . 109c (collectively "ramp sides 109") which protrude from a surface 112 of a respective one of the ramps 103 to provide a safety rail. In some embodiments, the ramp sides 109 can be trapezoidal-shaped, whereby the ends are cut or otherwise shaped at 90° angles to allow an end of the ramp side 109a to mount flush with an opposing end of the ramp side 109c at the coupling point 106.

Further, the first ramp 103a and the second ramp 103b can include supports 115 that protrude from the surface 112 of a respective one of the ramps 103, thereby providing paw or hoof support for a pet as it navigates the ramps 103. For example, the supports 115 may protrude an inch (or other suitable dimension) from the surface 112 of a respective one of the ramps 103. In some embodiments, the supports 115 span a width of the surface 112 of a respective ones of the ramps 103 such that they are coupled to the ramp sides 109.

Beyond coupling at the coupling point 106, the first ramp 103a and the second ramp 103b can be further coupled via coupling members 118a and 118b (collectively "coupling members 118") extending horizontally between the ramps 103. Like the ramp sides 109, the coupling members 118 can assume a trapezoidal shape, having ends cut or otherwise shaped at a suitable angle to mount flush with a bottom of the first ramp 103a and the second ramp 103 while being parallel to the ground, as illustrated in FIG. 1. As can be appreciated, the coupling members 118 provide further support as weight is applied to one of the ramp sides 109 or when the freestanding portable pet apparatus 100 is moved and relocated.

Bottom ends of the ramp sides 109 (opposite to that of the coupling point 106) can be coupled to ramp feet 121a and 121b (collectively "ramp feet 121"). As some embodiments described herein include the ramp sides 109 assuming a trapezoidal shape, a top surface of the ramp feet 121 can assume a same or similar angle as a bottom end of the ramp sides 109 such that the bottom end of the ramp sides 109 mates flush with the top surface of the ramp feet 121. The ramp feet 121 can include a width wider than the ramp sides 109 to provide additional support and balance to the freestanding portable pet apparatus 100. Additionally, a front 124 of the ramp feet 121 can assume an angle the same as or similar to that of the ramp sides 109, for example, to prevent a pet from stumbling on the ramp feet 121.

Figure 2:
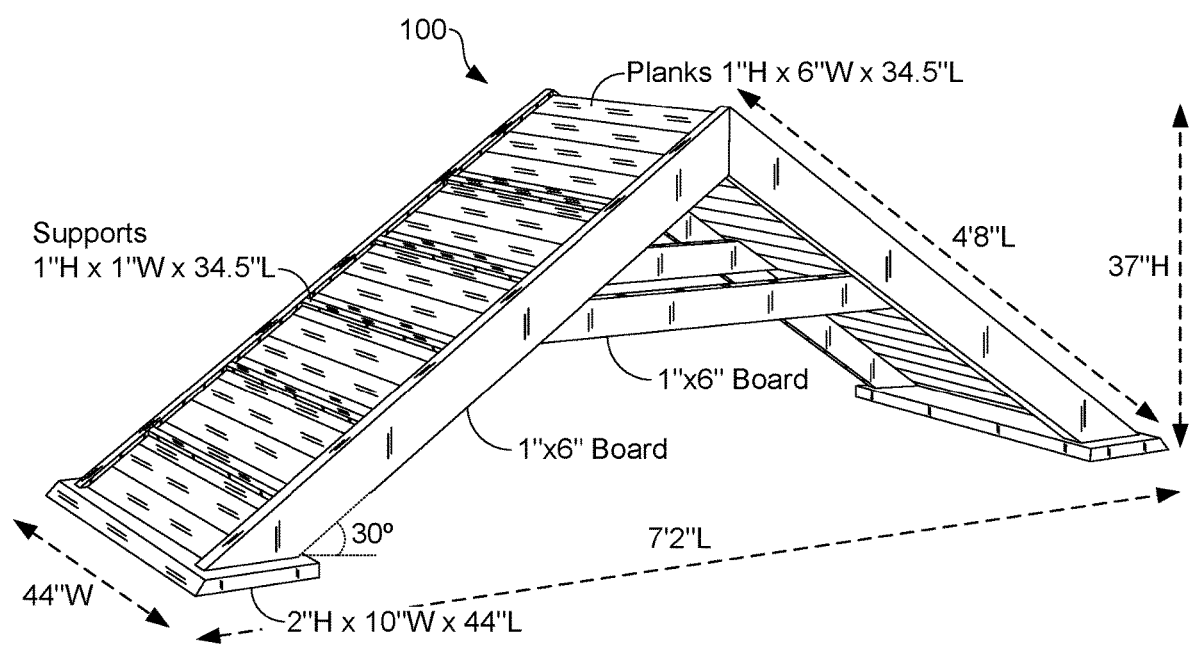
FIG. 2 shows example dimensions of the first embodiment of the freestanding portable pet apparatus of FIG. 1 according to various embodiments of the present disclosure.

Moving on to FIG. 2, example dimensions of the embodiment of the freestanding portable pet apparatus 100 of FIG. 1 are shown according to various embodiments of the present disclosure. In some embodiments, individual ones of the supports 115 can include a block with dimensions of approximately a height of one inch, a width of one inch, and a length of 34.5 inches. As can be appreciated, the supports 115 can assist pets, such as dogs, when ascending and descending on the ramps without sliding. In some embodiments, the surface 112 of the ramps 103 include wooden or plastic boards. To this end, in some embodiments, the boards can include dimensions of approximately a height of one inch, a width of 6 inches, and a length of 34.5 inches. In other embodiments, the boards can have a width of approximately 4 inches, 5.5 inches, or other suitable width.

The freestanding portable pet apparatus 100 can assume a height to width ratio that provides suitable stability without requiring affixation to the terrain using any concrete footers or other affixing mechanism. In one example, a height of the freestanding portable pet apparatus 100 is 37 inches and a length of the freestanding portable pet apparatus 100 is 7 feet and 2 inches (an approximate height to length ratio of 0.43), while the first ramp 103a and the second ramp 103b have a length of approximately 4 feet and 8 inches. The dimensions of the ramp feet 121 can include a height of 2 inches, a width of 10 inches, and a length of 44 inches. The coupling members 118 and the ramp sides 109 can be constructed from one inch by 6 inch boards or other material. In some embodiments, length of the ramps 103 can be 4 feet and 8 inches. The surface 112 of the ramps 103 can include multiple boards coupled together where each board has a height of one inch, a width of 6 inches, and a length of 34.5 inches. It should be noted that the dimensions described in FIG. 2 are merely for example purposes, and that the freestanding portable pet apparatus 100 can assume other dimensions, as suited.

Figure 3:
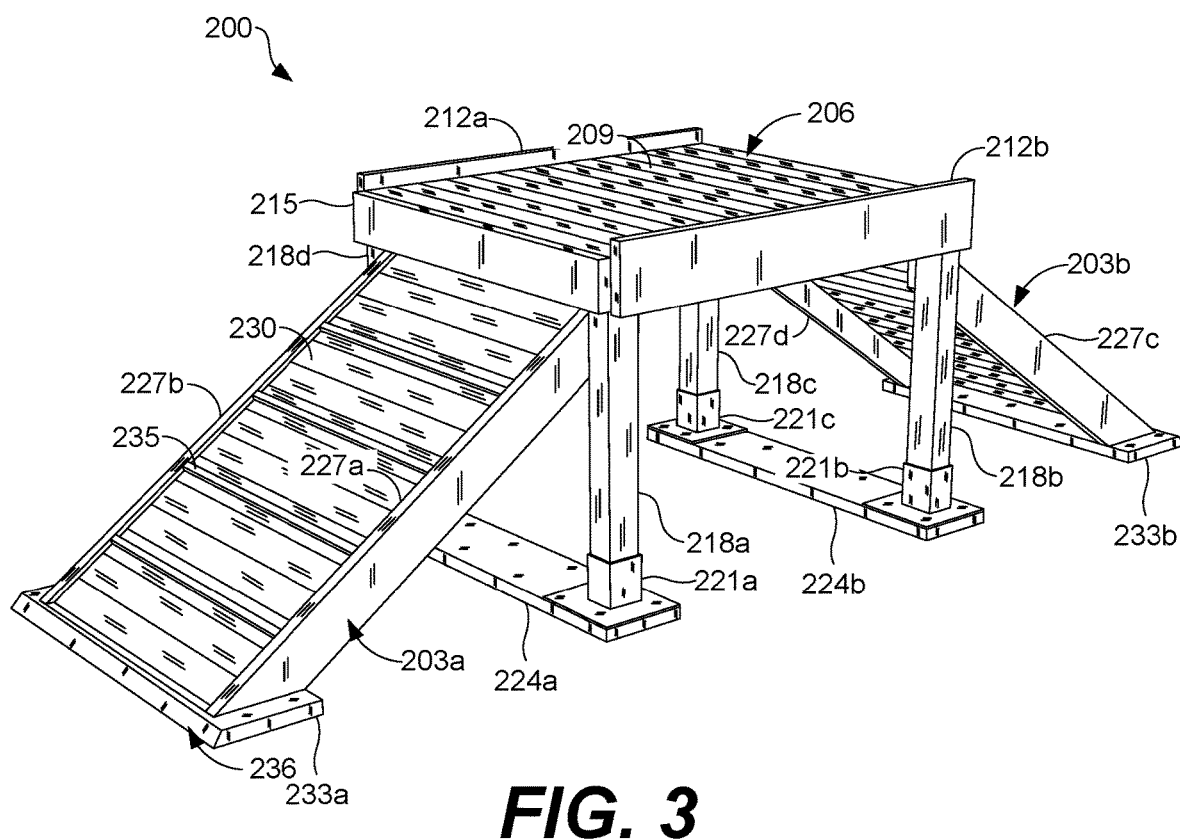
FIG. 3 shows a second embodiment of a freestanding portable pet apparatus according to various embodiments of the present disclosure.

Moving on to FIG. 3, shown is a second embodiment of a freestanding portable pet apparatus 200. In FIG. 3, the freestanding portable pet apparatus 100 is shown as having a first ramp 203a and a second ramp 203b (collectively "ramps 203"), with a platform 206 positioned between the first ramp 203a and the second ramp 203b, thereby forming a bridge or similar structure. In some embodiments, the freestanding portable pet apparatus 200 can be symmetrical in shape.

The platform 206 can include a platform surface 209, platform sides 212a and 212b (collectively "platform sides 212"), a platform front 215, and a platform back (not shown) at an opposite side of the platform 206 from the platform front 215. The platform 206 can be supported by a plurality of posts 218a . . . 218d (collectively "posts 218"). In some embodiments, the platform 206 is supported by four posts 218, although other suitable amount of posts 218 can be employed to provide load bearing stability.

The posts 218 can be positioned in post anchors 221a . . . 221c (collectively "post anchors 221") affixed to platform feet 224a and 224b (collectively "platform feet 224"). In some embodiments, the freestanding portable pet apparatus 200 can include two platform feet 224 where two posts 218 are positioned in each of the platform feet 224. The platform feet 224 can include a width that provides additional support and stability, as can be appreciated. In some embodiments, the posts 218 can be coupled directly to the platform feet 224 without using the post anchors 221.

The platform sides 212 can be configured to protrude beyond the platform surface 209 to act as a safety rail, thereby deterring a pet traversing the platform 206 from attempting to leave the platform surface 209 from one of the platform sides 212. The top of the platform front 215 and the platform back (not shown) can be flush with the platform surface 209.

The first ramp 203a and the second ramp 203b can assume an incline in the range of 20° to 35°, respectively; however, in alternative embodiments, each ramp 203 can assume a lower or higher degree of incline or decline as suited. The first ramp 203a and the second ramp 203b can include ramp sides 227a . . . 227d (collectively "ramp sides 227") which protrude from a ramp surface 230 of a respective one of the ramps 203. In some embodiments, the ramp sides 227 can assume a trapezoidal shape where the ends are cut or otherwise shaped at 90° angles.

Bottom ends of the ramp sides 227 (opposite to that of the platform 206) can be coupled to ramp feet 233a and 233b (collectively "ramp feet 233"). As some embodiments described herein include the ramp sides 227 assuming a trapezoidal shape, a top surface of the ramp feet 233 can assume a same or similar angle as a bottom end of the ramp sides 227 such that the bottom end of the ramp sides 227 mates flush with the top surface of the ramp feet 233. The ramp feet 233 can include a width wider to that of the ramp sides 227 to provide additional support and balance to the freestanding portable pet apparatus 200. Additionally, a front 236 of the ramp feet 233 can assume an angle the same as or similar to that of the ramp sides 227, for example, to prevent a pet from stumbling on the ramp feet 233. In some embodiments, a beam or other load bearing device (not shown), such as a 2×4, can be positioned on a bottom side of the ramp 203 parallel to and centered between the ramp sides 227, while spanning a length of the ramp 203. This load bearing device can provide additional support and stability for the ramps 203, as can be appreciated.

Further, the first ramp 203a and the second ramp 203b can include supports 235 that protrude from the ramp surface 230 of a respective one of the ramps 203, thereby providing paw or hoof support for a pet as it navigates the ramps 203. In some embodiments, the supports 235 assume a width of the surface 112 of a respective ones of the ramps 203 such that they can be coupled to the ramp sides 227.

In various embodiments, some or all of the components of the freestanding portable pet apparatus 200 described above can be constructed of recycled plastic, such as high-density polyethylene. In other embodiments, the components can be constructed of natural weather-resistant cedar or pressure-treated lumber. To this end, in various embodiments, the freestanding portable pet apparatus 200 can be positioned on a terrain without the use of concrete footers or any other permanent affixing mechanism, while remaining stable enough to withstand a load and movement of a pet without the apparatus moving or toppling over.

Figure 4:
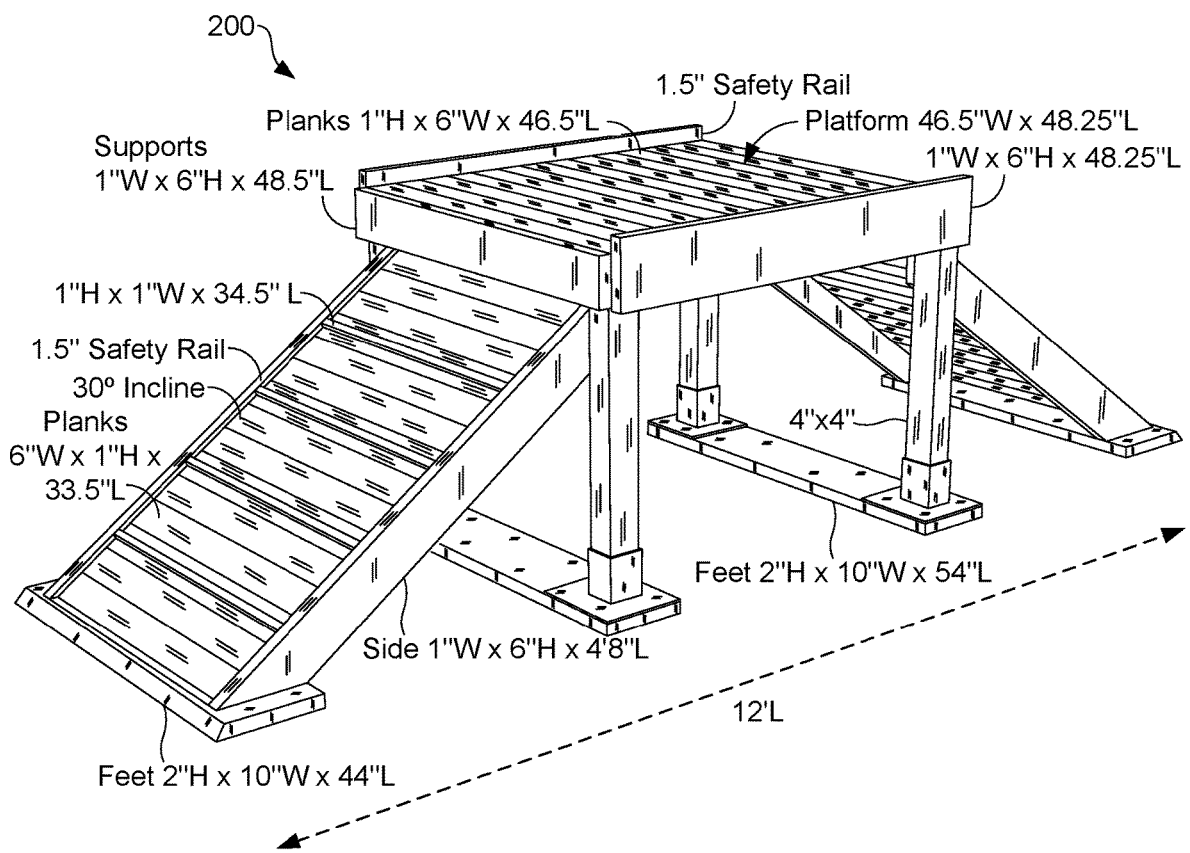
FIG. 4 shows example dimensions of the second embodiment of the freestanding portable pet apparatus of FIG. 3 according to various embodiments of the present disclosure.

Moving on to FIG. 4, example dimensions of the embodiment of the freestanding portable pet apparatus 200 of FIG. 3 are shown according to various embodiments of the present disclosure. In some embodiments, individual ones of the posts 218 can be 4 inches×4 inches. The platform sides 212 can have a width of approximately one inch, a height of approximately six inches, and a length of approximately 48.24 inches. The platform sides 212 can be situated in association with the platform surface 209 to create a safety rail of approximately 1.5 inches. The platform surface 209 can have a width of 46.5 inches and a length of 48.25 inches. The platform surface 209 can be made of a plurality of planks having a height of one inch, a width of 6 inches, and a length of 46.5 inches. The platform front 215 and the platform back (not shown) can have a width of one inch, a height of 6 inches, and a length of 48.5 inches.

The supports 235 can have a height of one inch, a width of one inch, and a length of 34.5 inches. The ramp sides 227 can have a width of one inch, a height of 6 inches, and a length of 4 feet and 8 inches. The ramp sides 227 can be positioned in association with the ramp surface 230 such that a 1.5 inch safety rail is formed on the ramp 203. The ramp feet 233 can have a height of 2 inches, a width of 10 inches, and a length of 44 inches. In addition, the front 236 of the ramp feet 233 can have a slope or incline substantially similar to a corresponding one of the ramps 203. In some embodiments, the ramps 203 can have a 30° incline. The ramp surface 230 can be made up of a plurality of planks having a width of 6 inches, a height of one inch, and a length of 33.5 inches. An overall length of the freestanding portable pet apparatus 200 can be 12 feet. It should be noted that the dimensions described in FIG. 4 are merely for example purposes, and that the freestanding portable pet apparatus 200 can assume other dimensions, as suited.

Figure 5:
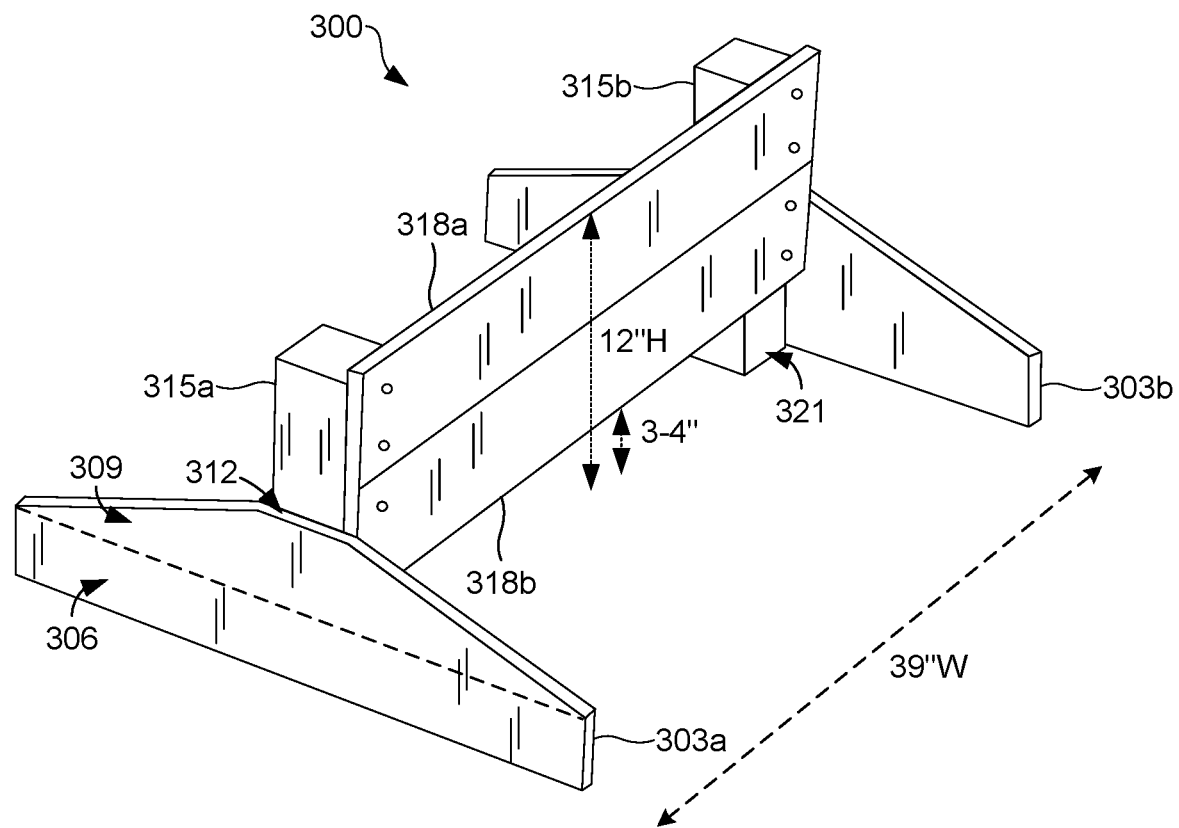
FIGS. 5-7 show examples of a third embodiment of a freestanding portable pet apparatus including hurdles according to various embodiments of the present disclosure.

Moving on to FIG. 5, a third embodiment of a freestanding portable pet apparatus 300 is shown. In FIG. 5, the freestanding portable pet apparatus 300 forms a hurdle, allowing a pet, such as a dog, to obtain physical activity by jumping over the hurdle. To this end, the freestanding portable pet apparatus 300 can include a first hurdle base 303a and a second hurdle base 303b (collectively "hurdle bases 303"). In some embodiments, a lower portion 306 of the hurdle bases 303 are rectangular in shape whereas an upper portion 309 of the hurdle bases 303 are triangular, trapezoidal, or rhombular (resembling a rhombus) in shape. In embodiments where the upper portion 309 of the hurdle bases 303 are rhombular, the top of the rhombular shape in the upper portion 309 can include a flat portion 312 located a top of the hurdle bases 303, as shown in FIG. 5.

A first hurdle post 315a can be coupled to directly an interior of the first hurdle base 303a while a second hurdle post 315b can be coupled directly to an interior of the second hurdle base 303b. In some embodiments, a width of the hurdle posts 315 can be substantially similar to a width to the flat portion 312 of the hurdle base 303. One or more boards 318a and 318b (collectively boards 318) can be coupled to the hurdle posts 315 while retaining an exposed lower portion 321 of the hurdle posts 315. In some embodiments, the boards 318 can be positioned to protrude above a top of the hurdle posts 315, while, in other embodiments, the boards 318 can be positioned to be flush with a top of the hurdle posts 315.

Further, the hurdle posts 315 can be positioned at a distal end of the boards 318 such that a side of the hurdle posts 315 and the boards 318 are flush with an interior side of the hurdle base 303. In some embodiments, a height of the freestanding portable pet apparatus 300 having two boards 318 can include approximately 12 inches, or other suitable height, while a width of the freestanding portable pet apparatus 300 is approximately 39 inches (e.g., height to width ratio of approximately 0.31).

Figure 6:
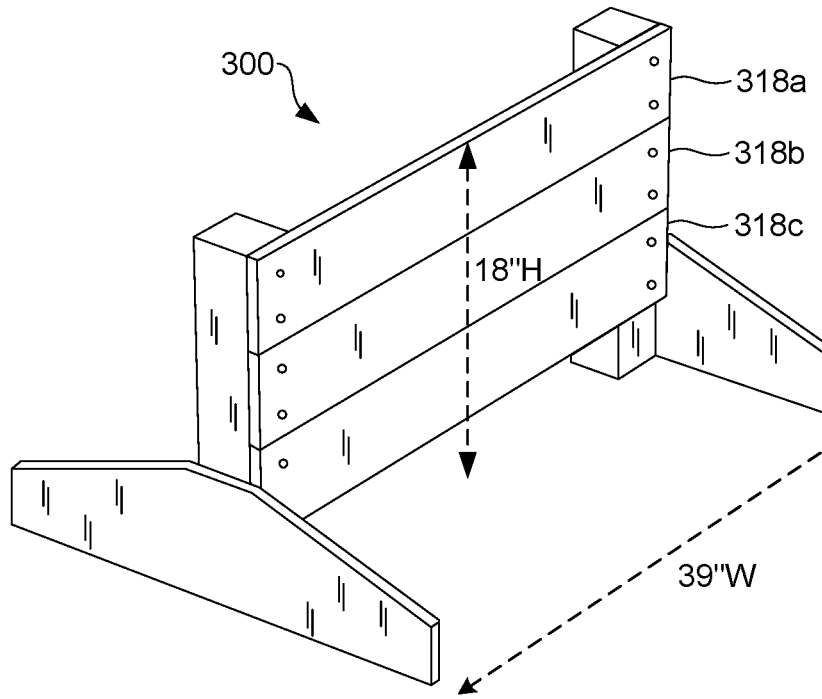
Figure 7:
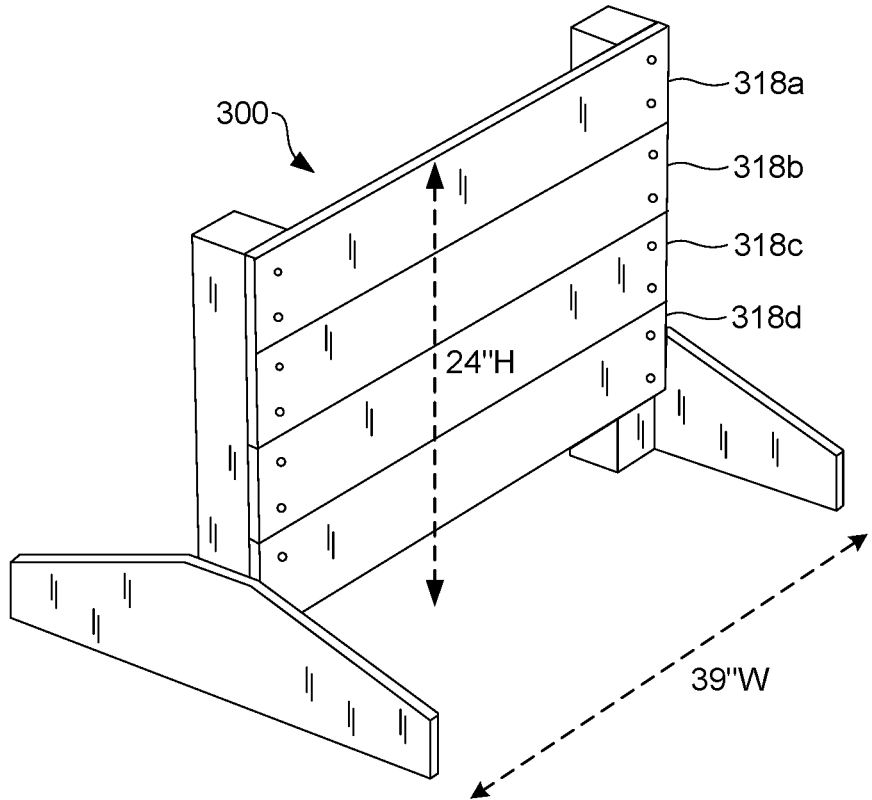

Another embodiment of the freestanding portable pet apparatus 300 having three boards 318a . . . 318c is shown in FIG. 6. In this example, a height of the freestanding portable pet apparatus 300 having three boards 318 can include approximately 18 inches, or other suitable height, while a width of the freestanding portable pet apparatus 300 is approximately 39 inches (e.g., height to width ratio of approximately 0.46). In FIG. 7, another embodiment of the freestanding portable pet apparatus 300 having four boards 318a . . . 318d is shown. In this example, a height of the freestanding portable pet apparatus 300 having four boards 318 can include approximately 24 inches, or other suitable height, while a width of the freestanding portable pet apparatus 300 is approximately 39 inches (e.g., height to width ratio of approximately 0.62). In some embodiments, a gap of approximately three to four inches, or other suitable dimension, is provided between a bottom of the boards 318 and the ground. In various embodiments, the freestanding portable pet apparatuses 300 of FIGS. 5-7 can be aligned in an order of increasing height or decreasing height, although other arrangements can be employed.

Figure 8:
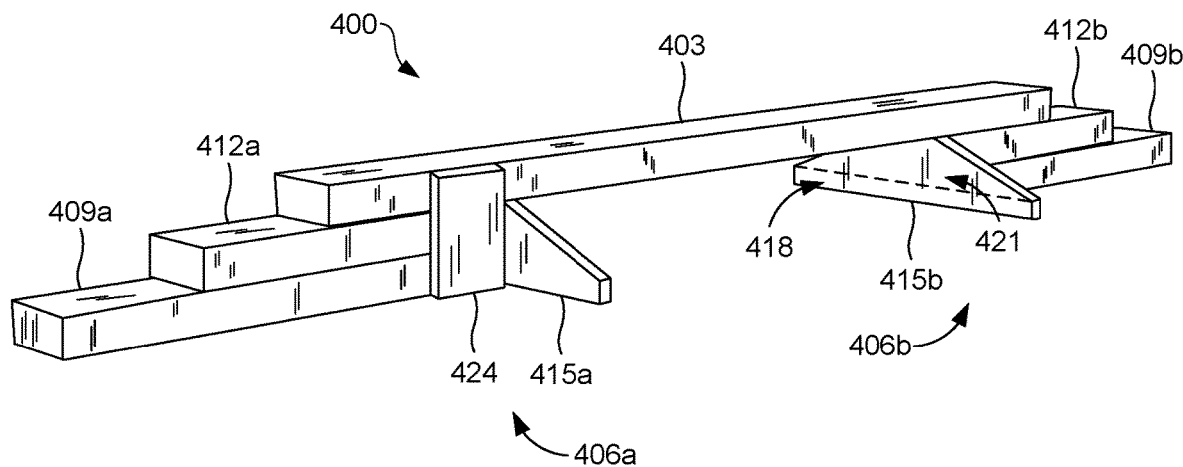
FIG. 8 shows a fourth embodiment of a freestanding portable pet apparatus according to various embodiments of the present disclosure.

Moving on to FIG. 8, shown is a fourth embodiment of a freestanding portable pet apparatus 400. In FIG. 8, the freestanding portable pet apparatus 400 can include a balance beam 403 for pets to navigate for training, exercise, or other physical activity. The balance beam 403 can be supported by a first beam base 406a and a second beam base 406b (collectively "beam bases 406"). The freestanding portable pet apparatus 400 can be symmetrical in some embodiments. The beam bases 406 can include, for example, a first step 409a and 409b, a second step 412a and 412b, and a horizontal support 415a and 415b perpendicular to a position of the balance beam 403. The first steps 409 can include an elongated structure disposed below the second steps 412, while the second steps 412 are disposed below the balance beam 403.

Similar to the hurdle base 303 described above with respect to FIG. 5, the horizontal supports 415 can be described as having a lower region 418 and an upper region 421. The lower region 418 can be substantially rectangular in shape while the upper region can be trapezoidal or rhombular in shape. As shown in FIG. 8, a top flat portion of the upper regions 421 of the horizontal supports 415 can assume a width substantially similar to that of the balance beam 403, while the upper region 421 and the lower region 418 extend outwards from the top flat portion, creating additional support and stability for the balance beam 403.

In some embodiments, the freestanding portable pet apparatus 400 can include a tie post 424 which couples the first step 409, the second step 412, the balance beam 403, and the horizontal support 415. In some embodiments, the tie post 424 is a height substantially similar to that of a top of the balance beam 403 such that the tie post 424 is flush with a top of the balance beam 403. Additionally, the tie post 424 can be positioned at an interior distal end of the beam base 406 to mount flush with a corner generated by the horizontal support 415.

Figure 9:
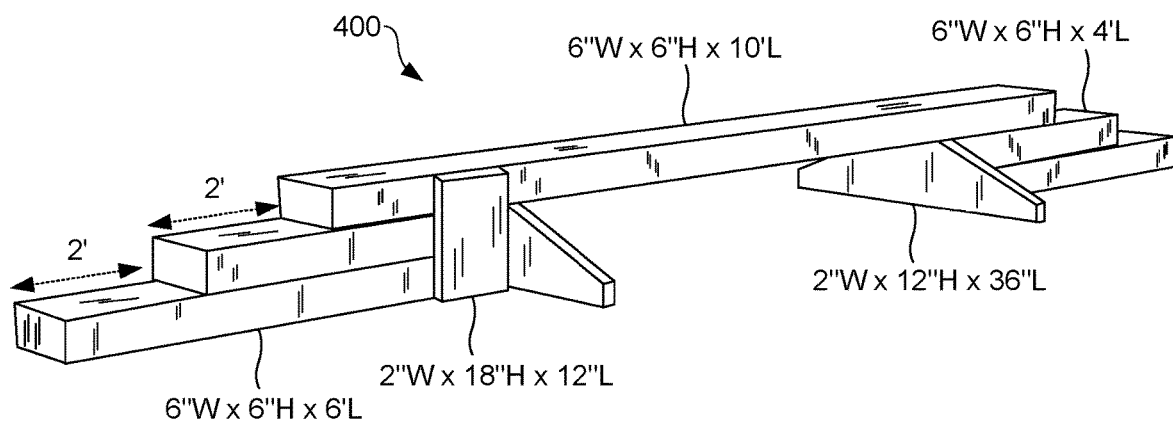
FIG. 9 shows example dimensions of the first embodiment of the freestanding portable pet apparatus of FIG. 8 according to various embodiments of the present disclosure.

Moving on to FIG. 9, example dimensions of the embodiment of the freestanding portable pet apparatus 400 of FIG. 8 are shown according to various embodiments of the present disclosure. In some embodiments, the balance beam 403 can have a width of 6 inches, a height of 6 inches, and a length of 10 feet. The first step 409 can have a width of 6 inches, a height of 6 inches, and a length of 6 feet. Disposed on the first step 409, the second step 412 can have a width of 6 inches, a height of 6 inches, and a length of 5 feet. When the first step 409 and the second step 412 are coupled at an interior distal end to the horizontal support 415, two two-foot steps are formed, with a third step being the balance beam 403. The tie post 424 can include a width of 2 inches, a height of 18 inches (or other height substantially similar to the overall height of the freestanding portable pet apparatus 400), and a length of 12 inches. The horizontal supports can include a width of 2 inches, a height of 12 inches, and a length of 36 inches. A top of the horizontal supports 415 can be substantially similar to a width of the balance beam 403. It should be noted that the dimensions described in FIG. 9 are merely for example purposes, and that the freestanding portable pet apparatus 400 can assume other dimensions, as suited.

In various embodiments, the components of the freestanding portable pet apparatuses 100, 200, 300, and 400 described herein can be constructed of recycled plastic, such as high-density polyethylene. In other embodiments, the components can be constructed of natural weather-resistant cedar or pressure-treated lumber. To this end, in various embodiments, the freestanding portable pet apparatuses 100, 200, 300, and 400 can be positioned on a terrain without the use of concrete footers or any other permanent affixing mechanism, while remaining stable enough to withstand a load and movement of a pet without the apparatus moving or toppling over.

Recycled plastic can include, for example, high-density polyethylene or another suitable material capable of bearing loads of one or more animals (plus a safety factor). The recycled plastic can also include fiberglass elements to reinforce the high density polyethylene. The recycled plastic can be treated by an extrusion process, which causes the recycled plastic to become textured and more-easily gripped. Therefore, pets can be able to move easier on the textured recycled plastic of the freestanding portable pet apparatus 200.

According to various embodiments, the recycled plastic can include ultraviolet additives to prevent deterioration when the recycled plastic is exposed to ultraviolet light. The recycled plastic can include a rot-resistant material and a splinter-free material. The recycled plastic can be resistant to marine borers, termites, fungus, salt and oils. The recycled plastic can also absorb up to approximately 6% moisture by weight. The recycled plastic can include a static dry coefficient of friction in the range of 0.3-0.6, a static wet coefficient of friction in the range of 0.3-0.6, a sliding dry coefficient of friction in the range of 0.2-0.3, and/or a sliding wet coefficient of friction in the range of 0.4-0.6.

As previously discussed, the various components described herein can include for example, boards or blocks made of cedar wood or another type of pressure-treated lumber. Cedar wood can be employed and particularly effective because of dogs' preference of its natural smell. A stain can be employed on the natural wood as cedar wood contains UV inhibitors, which can help preserve the wood and stain colorant. For example, the stain can include a 100% acrylic formula.

The components described herein can be coupled using glue, nails, screws, bolts, nuts, washers, and/or other suitable coupling mechanisms. To increase portability of the various apparatuses described herein, in some embodiments, screws are used to facilitate coupling and decoupling various components.

Figure 10:
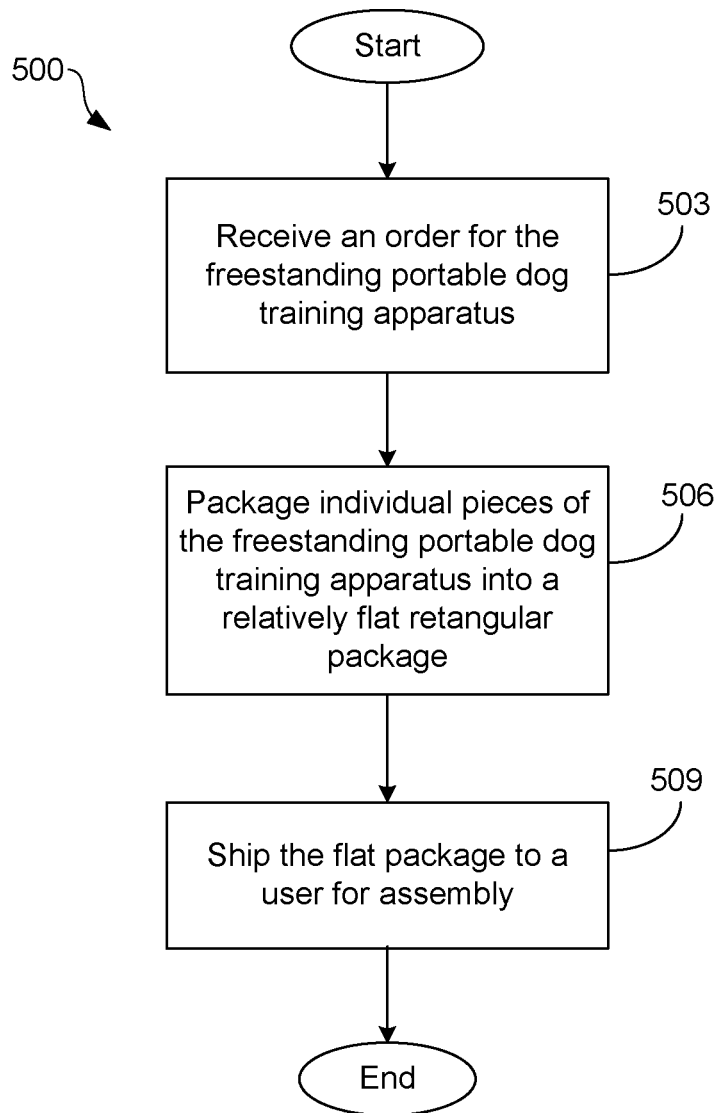
FIG. 10 is a flowchart illustrating an example of a method of providing the freestanding portable pet apparatus to an end user according to various embodiments of the present disclosure.

With reference to FIG. 10, shown is a flowchart 500 illustrating one example of a method of providing the freestanding portable pet apparatuses 100, 200, 300, and 400 to an end user according to various embodiments of the present disclosure. Beginning with box 503, an order is received for at least one of the freestanding portable pet apparatuses 100, 200, 300, and 400. The order can include a customized selection of the freestanding portable pet apparatuses 100, 200, 300, and 400. For example, the order may specify certain colors, designs, or examples. The order can be received for example, through an electronic commerce website, over the phone, or through any other suitable means. Next, in box 506, the individual pieces and components of the freestanding portable pet apparatuses 100, 200, 300, and 400 that were ordered are packaged into a relatively flat rectangular package to be sent to a user. The individual pieces can be assembled by a user without damaging a terrain that in which any piece of the freestanding portable pet apparatuses 100, 200, 300, and 400 comes into contact. For example, the user may use bolts to affix individual pieces together. Finally, at box 509, the package is sent to the user for assembly. The user can be, for example, a retail consumer, a distributor, or a commercial end-user.

Figure 11:
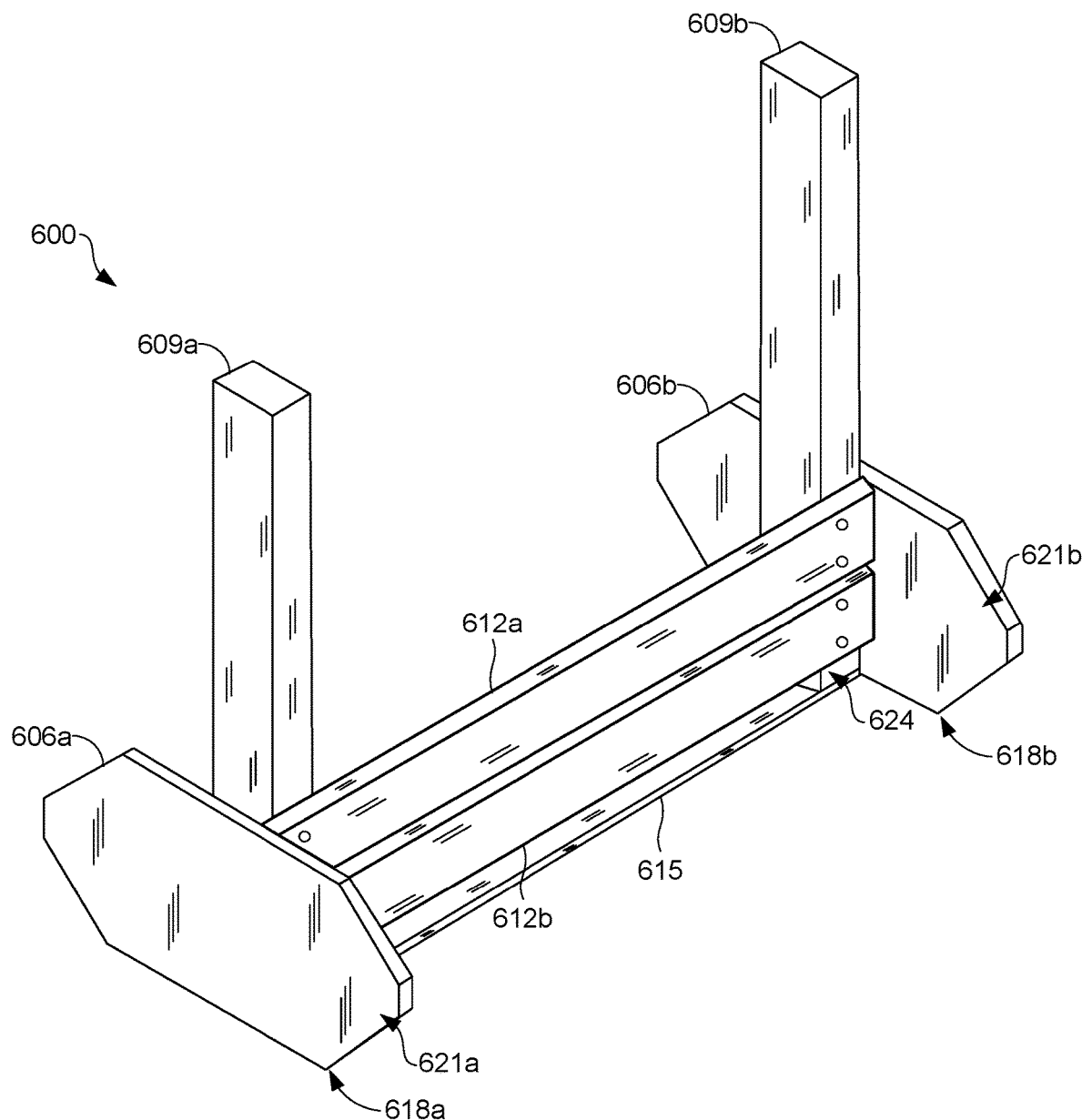
FIGS. 11, 12, 13, 14A, 14B, and 15 show examples of freestanding portable self-tipping hurdles according to various embodiments of the present disclosure.

Moving on to FIGS. 11, 12, 13, 14A, 14B, and 15, a hurdle 600 having self-tipping features is shown according to various embodiments. Similar to the other embodiments described herein, the hurdle 600 can be substantially symmetrical. Additionally, the hurdle 600 can be portable and freestanding, where the hurdle 600 is not fixedly attached or permanently affixed to the ground or other surface during operation. However, the hurdle 600 can be formed of a weight and include a structure that provides enough stability for exercising pets, such as dogs. The hurdle 600 can include a first hurdle base 606a, a second hurdle base 606b (collectively "hurdle bases 606"), a first hurdle post 609a, a second hurdle post 609b (collectively "hurdle posts 609"), and one or more hurdle boards 612a . . . 612b (collectively "hurdle boards 612") positioned between the hurdle bases 606, as well as positioned on the front of or between the hurdle posts 609 and affixed thereto. While the embodiment of FIG. 11 shows two hurdle boards 612, in other embodiments, the hurdle 600 can include one hurdle board 612, such as the embodiment shown in FIG. 12. In other embodiments, the hurdle 600 can include three hurdle boards 612, four hurdle boards 612, or other appropriate amount of hurdle boards 612 that would not interfere with the portability, freestanding, and self-tipping aspects of the hurdle 600.

In various embodiments, the hurdle 600 can include an elongated hurdle base 615 positioned between each of the hurdle bases 606 to prevent torque forces being applied to the hurdle boards 612 when the hurdle 600 is positioned, moved, or contacted by a pet attempting to jump over the hurdle 600. The hurdle posts 609 can be positioned on distal ends of the elongated hurdle base 615 where the distal ends of the elongated hurdle base 615 and the hurdle posts 609 mount flush with an interior of the hurdle bases 606. Moreover, the distal ends of the elongated hurdle base 615 can be coupled to a side of the hurdle bases 606 at a bottom portion of the hurdle bases 606. The elongated hurdle base 615 can have a width substantially similar to a width of the hurdle posts 609, as seen in a top view of the hurdle 600 in FIG. 13.

Figure 15:
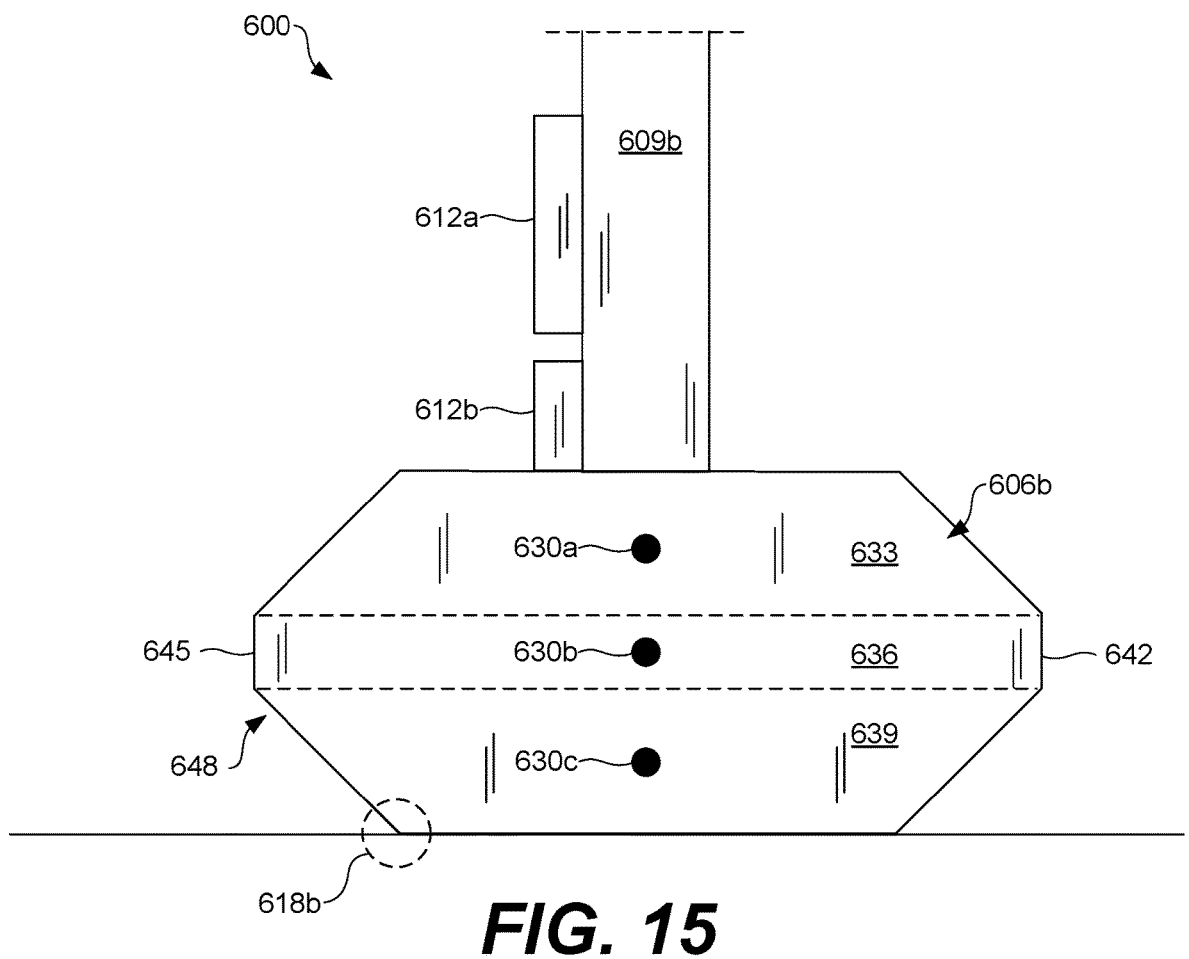

In various embodiments, each of the hurdle bases 606 include eight sides. Thus, the hurdle bases 606 can be described as having a generally octagonal (or perfect octagon) cross-section. As shown in FIGS. 11 and 15, the cross-section of the hurdle bases 600 can be described as an irregular elongated octagon, where a width of the octagon is greater than a height of the octagon. By virtue of the irregular elongated octagonal shape, when a force is applied to a backside of the hurdle 600 (e.g., when a dog or other pet makes contact with one of the hurdles), the force causes the hurdle 600 to tip forward or roll at tipping points 618a . . . 618b (collectively "tipping points 618"). Forward or front projecting portions 621a and 621b of the hurdle bases 606 allow the self-tipping hurdle to tip or rotate a predetermined amount prior to the rotation being substantially impeded by the forward projecting portions 621, namely, a lower forward side of the hurdle bases 606.

The hurdle boards 612 can be coupled to the hurdle posts 609 using an appropriate fastening means, such as a screw, while retaining an exposed lower portion 624 of the hurdle posts 609. In some embodiments, the hurdle boards 612 can be positioned to partially protrude above a top of the hurdle bases 606, while, in other embodiments, the hurdle boards 612 can be positioned to be flush with a top of the hurdle bases 606. A top most of the hurdle boards 612 can be positioned at a height to optimize tipping while taking into account the ability of the pet that will attempt to jump over the hurdle boards 612.

Further, the hurdle posts 609 can be positioned at a distal end of the hurdle boards 612 such that a side of the hurdle posts 609 and the hurdle boards 612 are coupled flush with an interior side of the hurdle base 606. In some embodiments, a width of the hurdle 600 is approximately 39 inches. In some embodiments, the hurdle 600 can have a height to width ratio of approximately 0.31. In other embodiments, the height of the hurdle 600 is approximately one-third of the width of the hurdle 600.

Figure 12:
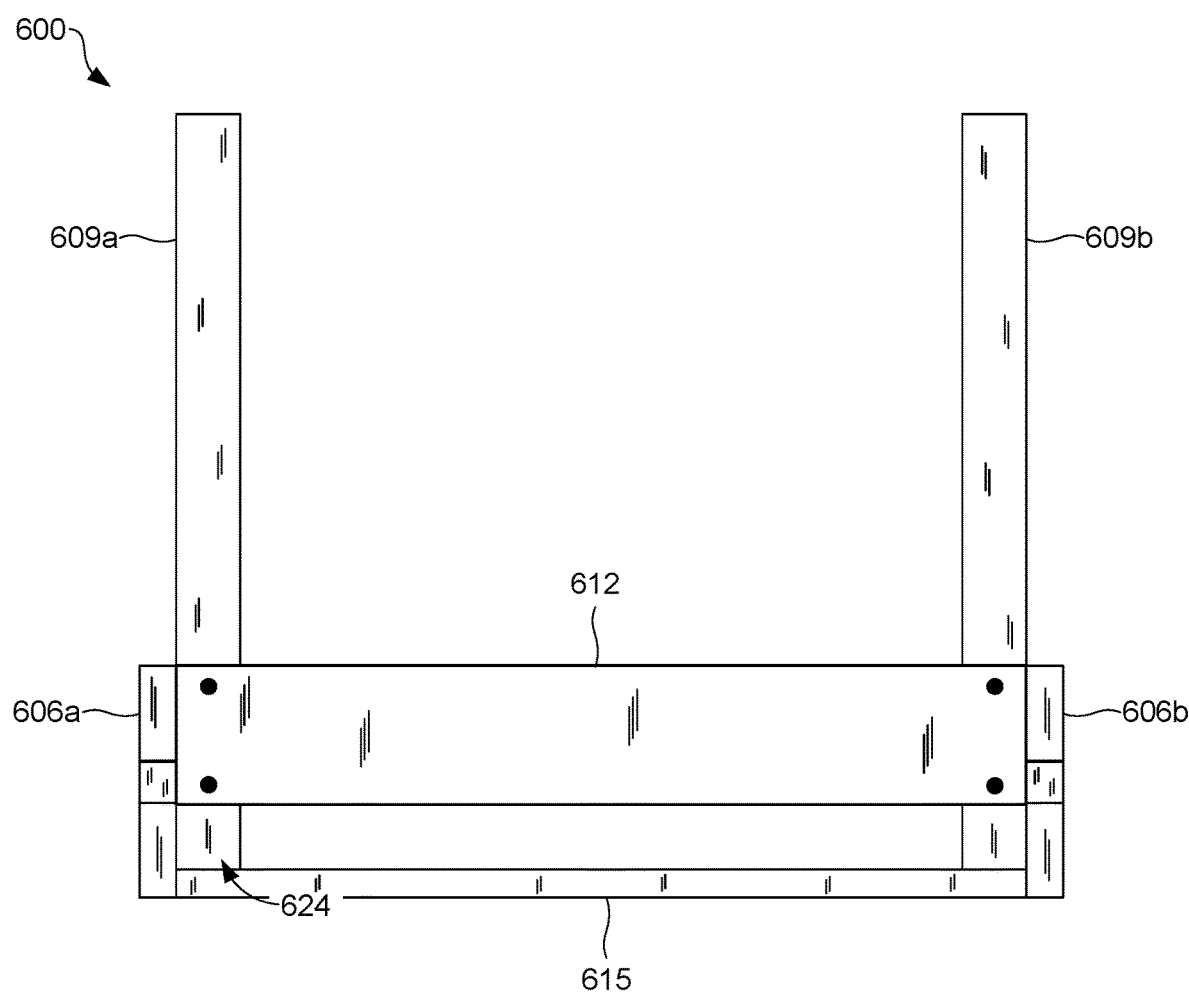
Figure 13:
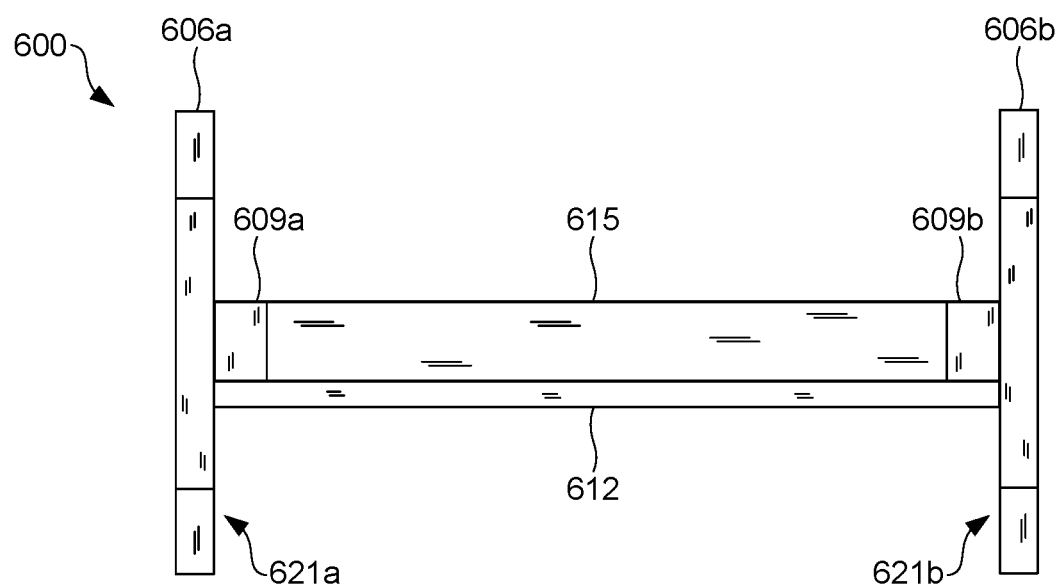

An embodiment of the hurdle 600 having a single hurdle board 612 is shown in FIG. 12. In some embodiments, a gap of approximately three to four inches, or other suitable dimension, is provided between a bottom of a bottom-most hurdle board 612 and the ground. In various embodiments, hurdles 600 having different quantities of hurdle boards 612 (e.g., one, two, three, and four) can be aligned in an order of increasing height or decreasing height, although other arrangements can be employed.

An enhanced view of the second hurdle base 606b is shown in FIG. 15. As noted above, the hurdle bases 606 can have an irregular elongated octagonal cross-section, where a width of the octagon is greater than a height of the octagon. This shape can be described as a top portion 633 of the hurdle base 606b being trapezoidal, a central portion 636 of the hurdle base 606b being rectangular, and a bottom portion 639 of the hurdle base 606b being trapezoidal, where the trapezoidal top portion 633 and the trapezoidal bottom portion 639 have a trapezoidal base coupled to the rectangular central portion 636. The trapezoidal top portion 633 and the trapezoidal bottom portion 639 can be elongated, where its width is greater than its height. The central portion 636 forms a front nose 642 and a rear nose 645 of the hurdle base 606 that, in some embodiments, is flat. The hurdle bases 606 can be coupled to the hurdle posts 609 using appropriate fastening means 630a . . . 630c, such as a screw or screw bolt.

Figure 14A:
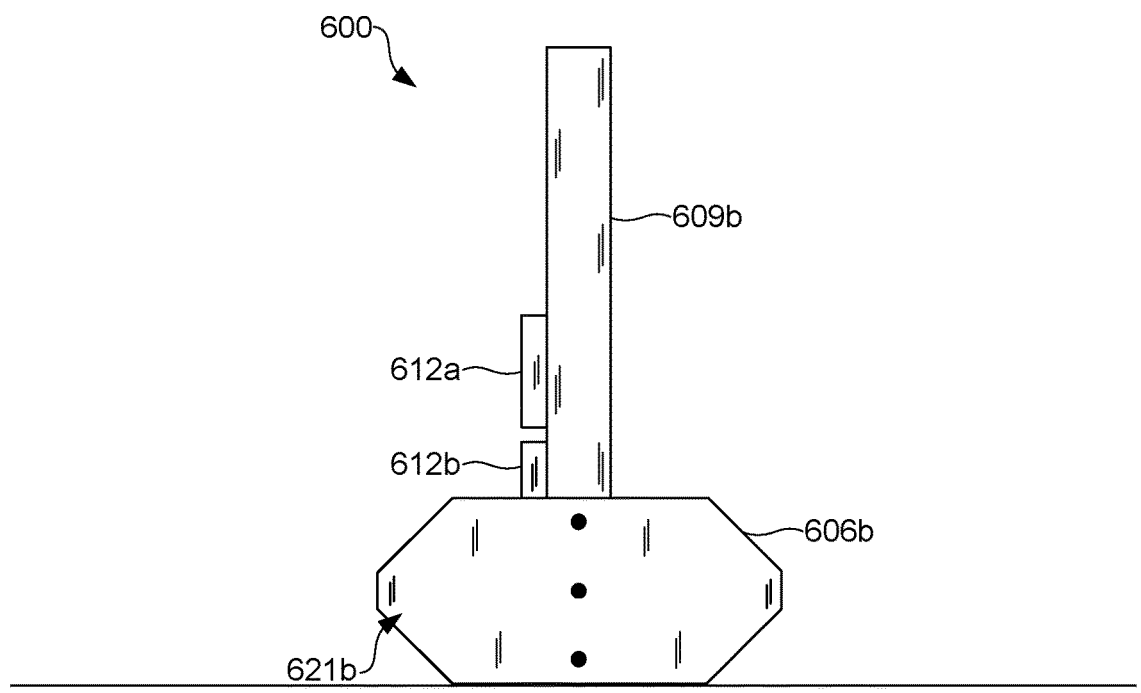
Figure 14B:
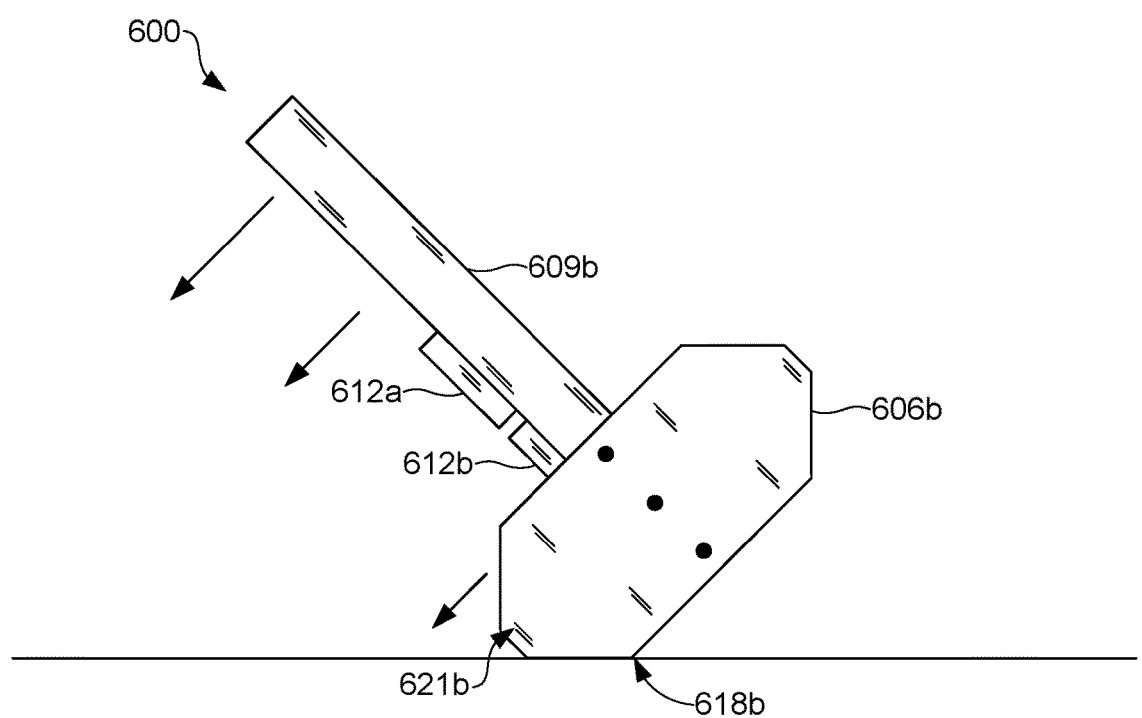

By virtue of the irregular elongated octagonal shape of the depicted embodiments, when a dog or other pet makes contact with the hurdle 600, the force causes the hurdle 600 to tip forward or roll at the tipping point 618b (e.g., FIG. 14b). Forward projecting portions 621 of the hurdle bases 606 allow the self-tipping hurdle to tip or rotate a predetermined amount prior to the rotation being substantially impeded by the forward projecting portions 621, namely, a lower forward side 648 of the hurdle bases 606.

In various embodiments, the components of the hurdles 600 described herein can be constructed of recycled plastic, such as high-density polyethylene. In other embodiments, the components can be constructed of natural weather-resistant cedar or pressure-treated lumber. To this end, in various embodiments, the hurdle 600 can be positioned on a terrain without the use of concrete footers or any other permanent affixing mechanism, while remaining stable enough to withstand a load and movement of a pet without the apparatus moving or toppling over.

Recycled plastic can include, for example, high-density polyethylene or another suitable material capable of bearing loads of one or more animals (plus a safety factor). The recycled plastic can also include fiberglass elements to reinforce the high density polyethylene. The recycled plastic can be treated by an extrusion process, which causes the recycled plastic to become textured and more-easily gripped. Therefore, pets can be able to move easier on the textured recycled plastic.

According to various embodiments, the recycled plastic can include ultraviolet additives to prevent deterioration when the recycled plastic is exposed to ultraviolet light. The recycled plastic can include a rot-resistant material and a splinter-free material. The recycled plastic can be resistant to marine borers, termites, fungus, salt and oils. The recycled plastic can also absorb up to approximately 6% moisture by weight. The recycled plastic can include a static dry coefficient of friction in the range of 0.3-0.6, a static wet coefficient of friction in the range of 0.3-0.6, a sliding dry coefficient of friction in the range of 0.2-0.3, and/or a sliding wet coefficient of friction in the range of 0.4-0.6.

As previously discussed, the various components described herein can include for example, boards or blocks made of cedar wood or another type of pressure-treated lumber. Cedar wood can be employed and particularly effective because of dogs' preference of its natural smell. A stain can be employed on the natural wood as cedar wood contains UV inhibitors, which can help preserve the wood and stain colorant. For example, the stain can include a 100% acrylic formula.

The components of the hurdle 600 described herein can be coupled using, for example, but not limited to, glue, nails, screws, bolts, nuts, washers, and/or other suitable coupling mechanisms. To increase portability of the various apparatuses described herein, in some embodiments, screws are used to facilitate coupling and decoupling various components.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

Therefore, the following is claimed:

1. A self-tipping hurdle for pet training and fitness, comprising:
   a first hurdle base having a first irregular octagonal cross-section;
   a second hurdle base having a second irregular octagonal cross-section;
   a first hurdle post coupled to the first hurdle base;
   a second hurdle post coupled to the second hurdle base;
   at least one hurdle board positioned between the first hurdle base and the second hurdle base and on a face of the first hurdle post and the second hurdle post;
   wherein the self-tipping hurdle is configured to rotate a predetermined amount prior to a rotation of the self-tipping hurdle being substantially impeded when the at least one hurdle board is contacted by a pet; and
   wherein the self-tipping hurdle is portable, freestanding, and substantially symmetrical.

2. The self-tipping hurdle of claim 1, wherein the at least one hurdle board comprises two hurdle boards, three hurdle boards, or four hurdle boards.

3. The self-tipping hurdle of claim 1, further comprising an elongated hurdle base positioned between the first hurdle base and the second hurdle base that prevents torque forces being applied to the at least one hurdle board.

4. The self-tipping hurdle of claim 3, wherein:
   the first hurdle post is positioned on a first distal end of the elongated hurdle base;
   the second hurdle post is positioned on a second distal end of the elongated hurdle base;
   a side of the first hurdle post and the first distal end of the elongated hurdle base is mounted flush to an interior of the first hurdle base; and
   a side of the second hurdle post and the second distal end of the elongated hurdle base is mounted flush to an interior of the second hurdle base.

5. The self-tipping hurdle of claim 4, wherein the elongated hurdle base has a width substantially similar to a width of the first hurdle post and the second hurdle post.

6. The self-tipping hurdle of claim 5, wherein:
   the first irregular octagonal cross-section has a width greater than a height of the first octagonal cross-section; and
   the second irregular octagonal cross-section has a width greater than a height of the second octagonal cross-section.

7. The self-tipping hurdle of claim 6, wherein the rotation of the self-tipping hurdle is substantially impeded by a lower forward side of the first hurdle base and the second hurdle base.

8. The self-tipping hurdle of claim 1, wherein:
   the at least one hurdle board is a bottom-most one of a plurality of hurdle boards; and
   the bottom-most one of the plurality of hurdle boards is positioned on the self-tipping hurdle to partially protrude above a top of the first hurdle base and the second hurdle base.

9. The self-tipping hurdle of claim 1, wherein:
   the at least one hurdle board is a bottom-most one of a plurality of hurdle boards; and
   the bottom-most one of the plurality of hurdle boards is positioned on the self-tipping hurdle such that a top of the bottom-most one of the plurality of hurdle boards is flush with a top of the first hurdle base and the second hurdle base.

10. The self-tipping hurdle of claim 1, wherein a width of the self-tipping hurdle is approximately 39 inches.

11. The self-tipping hurdle of claim 1, wherein the self-tipping hurdle comprises a height to width ratio of approximately 0.31.

12. The self-tipping hurdle of claim 1, wherein:
    the at least one hurdle board is a bottom-most one of a plurality of hurdle boards; and
    the bottom-most one of the plurality of hurdle boards is positioned on the self-tipping hurdle to provide a gap of approximately three to four inches between a bottom of a bottom-most one of the plurality of hurdle boards and the ground surface.

13. The self-tipping hurdle of claim 1, wherein:
    the at least one hurdle board is a bottom-most one of a plurality of hurdle boards; and
    the bottom-most one of the plurality of hurdle boards is positioned on the self-tipping hurdle to provide a gap of approximately three to four inches between a bottom of a bottom-most one of the plurality of hurdle boards and the ground surface.

14. An arrangement of a plurality of self-tipping hurdles for pet training and fitness, wherein at least one of the plurality of self-tipping hurdles comprises:
    a first hurdle base having a first irregular octagonal cross-section;
    a second hurdle base having a second irregular octagonal cross-section;
    a first hurdle post coupled to the first hurdle base;
    a second hurdle post coupled to the second hurdle base;
    at least one hurdle board positioned between the first hurdle base and the second hurdle base and on a face of the first hurdle post and the second hurdle post; and
    wherein the at least one of the plurality of self-tipping hurdles is configured to rotate a predetermined amount prior to a rotation being substantially impeded when the at least one hurdle board is contacted by a pet.

15. The arrangement of claim 14, wherein the at least one of the self-tipping hurdles further comprises an elongated hurdle base positioned between the first hurdle base and the second hurdle base that prevents torque forces being applied to the at least one hurdle board.

16. The arrangement of claim 15, wherein:
the first octagonal cross-section has a width greater than a height of the first octagonal cross-section; and
the second octagonal cross-section has a width greater than a height of the second octagonal cross-section.

17. The arrangement of claim 16, wherein the first hurdle base and the second hurdle base comprise:
a trapezoidal top portion;
a rectangular central portion; and
a trapezoidal bottom portion, wherein the trapezoidal top portion and the trapezoidal bottom portion have a trapezoidal base coupled to the rectangular central portion.

18. The arrangement of claim 17, wherein the trapezoidal top portion and the trapezoidal bottom portion are elongated, the trapezoidal top portion and the trapezoidal bottom portion having a width greater than a height.

19. The arrangement of claim 17, wherein the rectangular central portion forms a front flat nose and a rear flat nose on the first hurdle base and the second hurdle base.

20. A method, comprising:
providing a self-tipping hurdle for pet training and fitness, comprising:
a first hurdle base having a first irregular octagonal cross-section;
a second hurdle base having a second irregular octagonal cross-section;
a first hurdle post coupled to the first hurdle base;
a second hurdle post coupled to the second hurdle base;
at least one hurdle board positioned between the first hurdle base and the second hurdle base and on a face of the first hurdle post and the second hurdle post;
wherein the self-tipping hurdle is configured to rotate a predetermined amount prior to a rotation of the self-tipping hurdle being substantially impeded when the at least one hurdle board is contacted by a pet; and
wherein the self-tipping hurdle is portable, freestanding, and substantially symmetrical, the hurdle not being configured to be affixed to a ground surface during operation.

* * * * *